April 2, 1940.   A. J. CHESSON   2,195,616
WATER SOFTENING DEVICE
Original Filed April 19, 1938   2 Sheets-Sheet 1
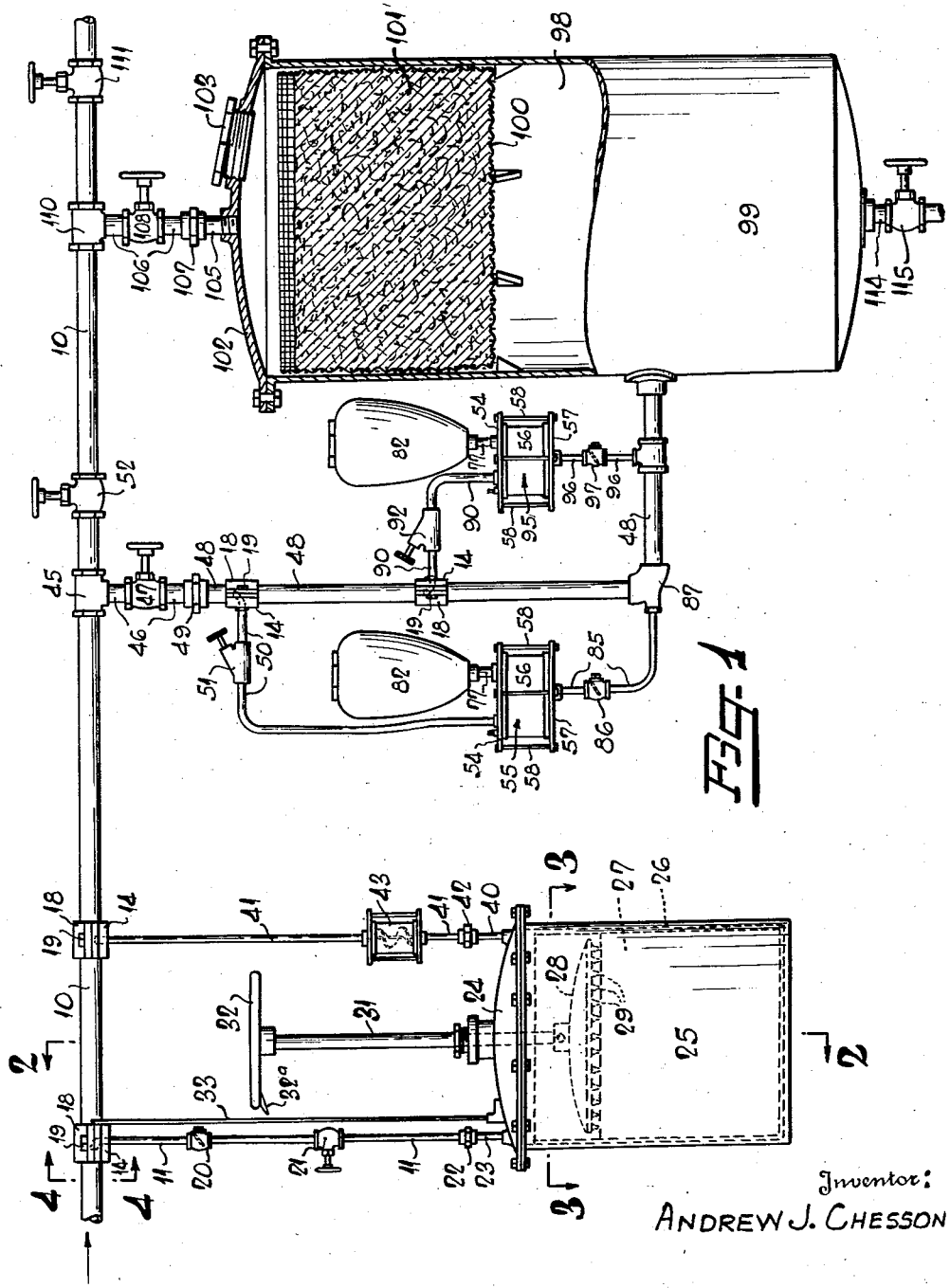

April 2, 1940.  A. J. CHESSON  2,195,616
WATER SOFTENING DEVICE
Original Filed April 19, 1938   2 Sheets-Sheet 2
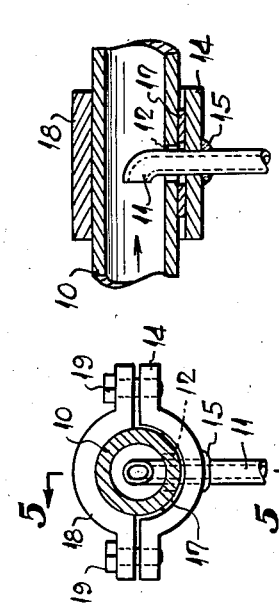
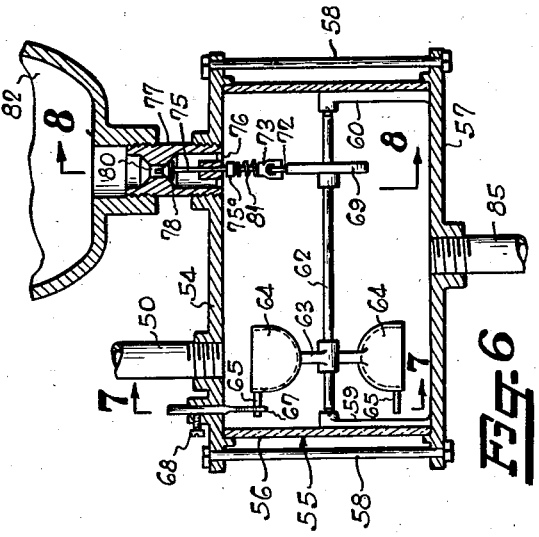
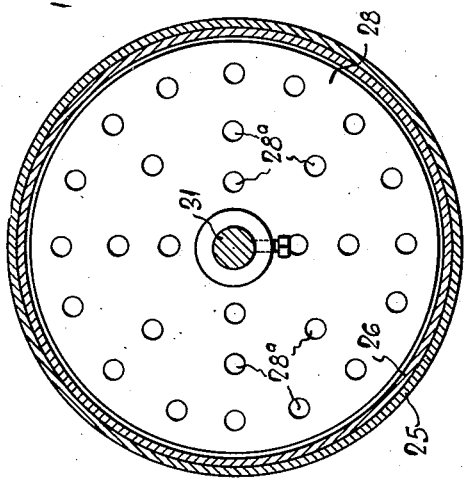
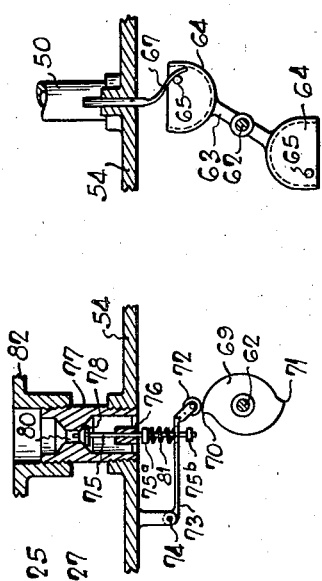
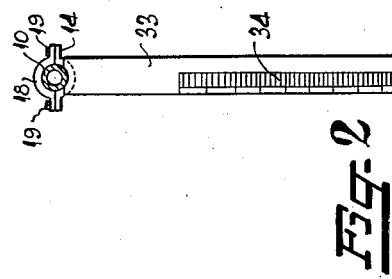
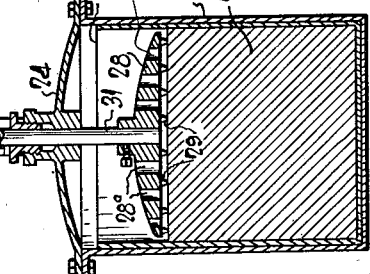
Inventor:
Andrew J. Chesson
Attorney Patented Apr. 2, 1940

2,195,616

UNITED STATES PATENT OFFICE 2,195,616

WATER SOFTENING DEVICE

Andrew J. Chesson, Miami, Fla.

Application April 19, 1938, Serial No. 202,921
Renewed August 24, 1939

5 Claims. (Cl. 210—36)

This invention relates to a water treating apparatus in which a fractional portion of a supply of water is by-passed over a cake of water softening material from whence this portion is returned to the main line of flow. The water, which is by-passed over this material, absorbs a certain portion of the softening material. When the treated by-passed water returns to main line, it mixes with the water which was by-passed so that all of the water is properly treated with this softening material. Heretofore, it has been the practice to pour a concentrated mixture into a tank, and let it harden so that it may be contacted in the manner just described. After much use, there has been a tendency for the sedimentation, within the water which moves over this material, to form a layer on top of the cake and prevent the proper contact from being made between the water and the treating solid.

It is, therefore, an object of this invention to provide a casing in which a block of water softening chemical is adapted to be removably installed and over which a fractional portion of the water flowing through the main line is passed thereover, with means disposed on the top of said block for scarifying or cleaning the same at the desired time to break and agitate the film or coat of sedimentation which might form on top of the chemical after a continued use.

It is another object of this invention to provide in combination with an apparatus of this type, means for periodically adding predetermined quantities of chlorine solution to the softened solution and a further means for adding predetermined quantities of a coagulating agent such as alum to this same solution.

It is a further object of the invention to provide a tank having a filter in the upper portion thereof, and a water compartment disposed in the lower portion into which the treated water is adapted to flow. The water coming from the softening device will be discharged into the space below the filter and its force will be dissipated. This will allow the proper coagulation to take place, after which the treated water will seep upwardly through the filter and to the dispensing points.

Any suitable composition of materials may be employed in the cake of softening material, such as a mixture of colloidal clay, sodium silicate, soda ash and borax. Another suitable composition may comprise crystallized trisodium phosphate 95 parts and sodium metasilicate pentahydrate 17 parts.

Subject matter relating to the filter and dispensing means is being claimed in a separate application of mine, bearing Serial Number 266,284 and filed on the 6th day of April, 1939.

Some of the objects of the invention having been stated, other objects will appear as the description proceeds when taken in connection with the accompanying drawings, in which—

Figure 1 is an elevation of my invention showing certain portions thereof in section.

Figure 2 is a transverse sectional view through the water softening mechanism and taken along the line 2—2 in Figure 1;

Figure 3 is an enlarged sectional plan view taken along the line 3—3 in Figure 1;

Figure 4 is an enlarged vertical sectional view taken along the line 4—4 in Figure 1;

Figure 5 is a detail sectional view taken along the line 5—5 in Figure 4;

Figure 6 is a vertical sectional view through the apparatus for admitting predetermined quantities of chlorine, chloride of lime, or other treating solution to the softened water;

Figure 7 is a sectional view taken along the line 7—7 in Figure 6;

Figure 8 is a vertical sectional view taken along the line 8—8 in Figure 6.

Referring more specifically to the drawings, the numeral 10 denotes a water supply main through which water is adapted to flow from any suitable source such as a reservoir to a dispensing point such as a spigot. Disposed in this pipe is the upper end of a Pitot tube 11 (see Figures 4 and 5), the open end of which is directed against the flow of water within the main 10. This tube penetrates a suitable hole 12 in the lower side of the main, and immediately below this point of penetration, the tube 11 is secured to a semi-circular clamp member 14 by any suitable means such as welding 15. Disposed between this member 14 and the lower side of the pipe is a suitable gasket 17 to prevent any leakage of water from the pipe at this point. The member 14 is held against the lower side of main 10 by means of another semi-circular clamp member 18 and stud bolts 19. As the water flows through the main 10 from left to right in Figures 1 and 5 it is seen that the Pitot tube will direct a fractional portion thereof downwardly from the main 10.

The tube 11 has a check valve 20 and a hand valve 21 installed therein. The lower end of the tube 11 has a suitable union 22, which connects the lower end of tube 11 to another tube 23, said tube 23 being secured to a cap 24 of container 25. The interior of container 25 has another container 26 removably placed therein. This container is adapted to have a suitable water softening cake of material 27 moulded therein and disposed on the top of this cake is disk 28, having prongs 29 integral with the lower side thereof. The disk 28 is secured on the lower end of rod 31 which extends upwardly and is rotatably mounted in the central portion of cap member 24.

The upper end of the rod 31 has a suitable hand wheel 32 secured thereto which may be manually turned when it is desired to rotate the teeth 29 and scarify the top side of the cake of material 27. By turning the wheel 32, the sedimentation which has collected upon the cake 27 will be loosened as well as some of the softening chemical. In order to insure that the water which flows into the upper portion of tank 25 will contact the top of chemical cake 27, a plurality of holes 28a are provided in the top side of disk 28. After continued use the water which flows into the top of the container 25 and over the cake 27 will cause the top of the chemical cake 27 to be gradually washed away, and, therefore, the disk 28 and its associated parts will be gradually lowered. The hand-wheel 32 has a pointer 32a integral therewith, which is adapted to be positioned adjacent a suitable ruler 33, said ruler having graduations 34 thereon which correspond to the depth of the cake 27. The lower end of ruler 33 is adapted to rest on top of disk 28 to indicate the amount of water softening material still remaining undissolved.

Pipe 40 leads from the upper side of cap member 24. This pipe is preferably disposed in the cap at an angle of 180 degrees from the pipe 23, so that the water which enters the container 25 will flow across the top surface of the cake of softening material 27. The upper end of pipe 40 is connected to a pipe 41 by any suitable means such as union 42. The pipe 41 has a visualizer 43 installed therein which will enable one to ascertain upon a moment's notice the direction of flow of water through the pipe 41.

The upper end of pipe 41 is adapted to communicate with the water main 10. The connection at this point is similar to the connection of Pitot tube 11 and hence another description will not be made but like reference characters will be given to like parts. However, it might be stated that the upper end of the tube 41 feeds in at an angle of 90 degrees to the water main and is not curved at its upper end as in case of the Pitot tube 11.

The main 10 has a T 45 installed therein from which leads a pipe 46, which pipe has a hand-valve 47 therein. The pipe 46 is connected to another pipe 48 by any suitable means such as union 49. Leading from the pipe 48 is another Pitot tube 50 which is similar in all respects to the Pitot tube 11 just described, and disposed in the tube 50 is a needle 51 which is operated to control the flow of liquid. It should be noted that the main 10 also has a hand valve 51 installed therein which is normally closed; therefore, the entire supply of water which flows through the main 10 will be directed downwardly through pipe 46. The lower end of the tube 50 is threadably secured into cap member 54 of mixing chamber 55. This cap has a transparent casing 56 disposed on the lower side thereof and on the lower side of this casing 56 is a bottom 57. The members 54, 56 and 57 are held together by any suitable means such as vertically disposed bolts 58.

The bottom 57 has bearings 59 and 60 extending upwardly therefrom, between which shaft 62 is mounted (Figures 6, 7 and 8). This shaft has fixedly secured thereon an arm 63, each end of which supports a cup 64. Each of these cups has a pin 65 extending laterally therefrom which is adapted to engage the lower end of flexible spring member 67, said spring member 67 being adjustably secured in the cover member 54 by any suitable means such as a set screw 68.

The water which is directed downwardly into the mixing chamber 55 by tube 50, is adapted to flow into one of the cups 64 which is disposed beneath the outlet port of tube 50. The spring member 67 is adapted to be so adjusted relative to the pin 65 that when the cup 64 becomes filled to the desired extent, the lower end of the springs 67 will deflect sufficiently to allow the filled cup 64 to rotate the shaft 65 approximately 180 degrees to empty its contents into the mixing chamber 55. When this is done, the lowermost cup 64 will occupy the position that the uppermost cup previously occupied relative to the spring 67, after which the water will flow into this cup.

The shaft 62 has a cam 69 fixedly secured thereon (see Figures 6 and 8) said cam having high points 70 and 71 thereon. The periphery of this cam is adapted to be contacted by roller 72 in the free end of a lever 73. This lever is pivotally secured as at 74 to the lower side of cap member 54. The intermediate portion of lever 73 is loosely penetrated by a vertically disposed pin 75, which pin extends upwardly and is slidably mounted in spider member 76, said spider member being secured in the lower portion of pipe 77. The upper portion of the pin 75 has a valve cap 78 thereon which closes port 80 when the roller 72 is disposed on the high side of the cam 69. Also disposed around pin 75 are collars 75a and 75b, the collar 75a being so positioned as to confine a coiled compression spring 81 around pin 75 and between this collar and lever 73. It is seen that this spring will allow a certain amount of flexibility to be added to the upward movement of the pin 75 and the valve cap 78. Threadably secured on the upper side of pipe 77 is a reservoir 82 in which a suitable sterilization agent is adapted to be placed, such as chlorine, or chloride of lime, for purifying the water.

When one of the cups 64 becomes filled, the shaft 62 is allowed to rotate approximately 180 degrees, at which time the roller 72 will move past one of the points 70 and 71 to release the valve cap 78 and allow a predetermined quantity of chlorine, or chloride of lime, to flow downwardly into the mixing chamber 55. When the 180 degree rotation has taken place, the roller 72 again rides upon the high side of the cam 69 to cause the port 80 to be closed.

The lower side of the mixing chamber 55 has a tube 85 leading therefrom, said tube having a check valve 86 therein, for preventing reverse flow of the fluid. This tube leads into pipe 48 as at 87.

It is sometimes also desirable to add a suitable coagulating agent such as alum to the water in order that the free particles in the water will coagulate and settle. For this purpose a similar device is used, to that which has just been described for adding a chlorine agent. A Pitot tube 90 leads from the pipe 48, said tube having a needle valve 92 therein for controlling the flow. The lower end of the tube 90 leads to a mixing chamber 95, which is identical in all respects to the mixing chamber 95 just described. Since all parts are identical, a new description will not be made but like reference characters will be given to like parts. Leading from the lower side of mixing chamber 95 is another tube 96, having a check valve 97 therein for preventing the reverse flow of the fluid through the pipe 96 and upwardly through the mixing chamber.

After the sterilization and coagulating elements have been added to the softened water, the entire supply is emptied into compartment 98 of tank 99. By providing this compartment, into which the water is discharged, the flow will be dissipated and the free particles in the water will settle to the bottom of the tank. The upper portion of this tank 99 has a suitable screen basket 100 installed therein which is adapted to contain a suitable filtering material such as sassafras root or charcoal 101. The upper portion of tank 99 has a cover 102 secured thereto, and this cover has a plug 103 threadably secured therein which is used for supplying new filtering materials 101 into the tank. The cap 102 has also a pipe 105 threadably secured therein. This pipe is joined to another pipe 106 by means of a union 107, said pipe 106 having a hand valve 108 therein. The upper end of pipe 106 leads back into main 10 at the T member 110. Therefore it is seen that the sedimentation in the treated water is allowed to settle in the lower portion of compartment 98 after which the water is directed upwardly through the filter 101 and outwardly through pipes 105 and 106, and then back again into the main 10. When in the main 10 the water flows through hand valve 111 to any suitable source of dispensation.

The lower side of the tank 99 has a pipe 114 leading therefrom, in which a hand valve 115 is installed. When it is desired to wash the filter by reversing the flow in the tank 99, it is necessary to close the hand valves 111 and 67 and then open the hand valves 115 and 62. The water will then be allowed to flow through the main 10 downwardly through pipe 106, pipe 105, filter material 101, chamber 98 and out through pipe 114 and hand valve 115. This will not only clean the filter 101 but will also wash the sedimentation out of the bottom of tank 99.

In the drawings and specification there has been set forth a preferred embodiment of the invention, and although specific terms are employed, they are used in a generic and descriptive sense only, and not for the purposes of limitation, the scope of the invention being set forth in the appended claims.

I claim:
1. Water softening apparatus adapted to be attached to a water main, comprising a casing, a cake of water softening material molded in said casing, a second casing in which the first casing is adapted to snugly fit, the upper ends of both casings being open, a cap member closing the second casing, a Pitot tube communicating with said water main and with the interior of the second casing, a second pipe communicating also with the upper end of said second casing and with said water main, and a disk having projections on its lower face adapted to rest on said cake, and means for rotating said disk to remove sedimentation from the upper surface of the cake.

2. Water softening apparatus adapted to be attached to a water main, comprising a casing, a cake of water softening material molded in said casing, a second casing in which the first casing is adapted to snugly fit, the upper ends of both casings being open, a cap member closing the second casing, a Pitot tube communicating with said water main and with the interior of the second casing, a second pipe communicating also with the upper end of said second casing and with said water main, a disk having projections on its lower face adapted to rest on said cake, means for rotating said disk to remove sedimentation from the upper surface of the cake, and a gauge slidably penetrating said cap member and adapted to rest on said disk member to indicate the amount of the cake remaining in the first casing.

3. Water softening apparatus comprising a container having sidewall and bottom portions and being open at the top, a second container conforming to the contour of the first container and also being open at the top and being adapted to snugly fit into the first container, the second container having solidified water softening material molded therein, a cap closing the upper open end of the first container, means for bypassing some of the water from a water main through the apparatus comprising a Pitot tube connected to the water main and penetrating said cap, and a pipe also penetrating said cap and having its other end connected to the water main.

4. Water softening apparatus comprising a container having sidewall and bottom portions and being open at the top, a second container conforming to the contour of the first container and also being open at the top and being adapted to snugly fit into the first container, the second container having solidified water softening material molded therein, a cap closing the upper open end of the first container, means for bypassing some of the water from a water main through the apparatus comprising a Pitot tube connected to the water main and penetrating said cap, a pipe also penetrating said cap and having its other end connected to the water main, and a flow direction indicator disposed in said second pipe.

5. Water softening apparatus comprising a cylindrical container having a closed bottom, a cap secured to the open top of the container, a second container filled with a solidified cake of water-softening composition and snugly fitting in the first container and substantially filling the first container, the second container having an imperforate bottom and an open top, an intake pipe leading from a water main into the upper portion of the first container and a return pipe connected to the upper part of the first container above the upper edge of the second container and to said water main, whereby the by-passed water will wash the upper surface of the cake of softening composition in the second container, the second container being easily removable from the first container when said cap is removed.

ANDREW J. CHESSON.